United States Patent Office 3,067,184
Patented Dec. 4, 1962

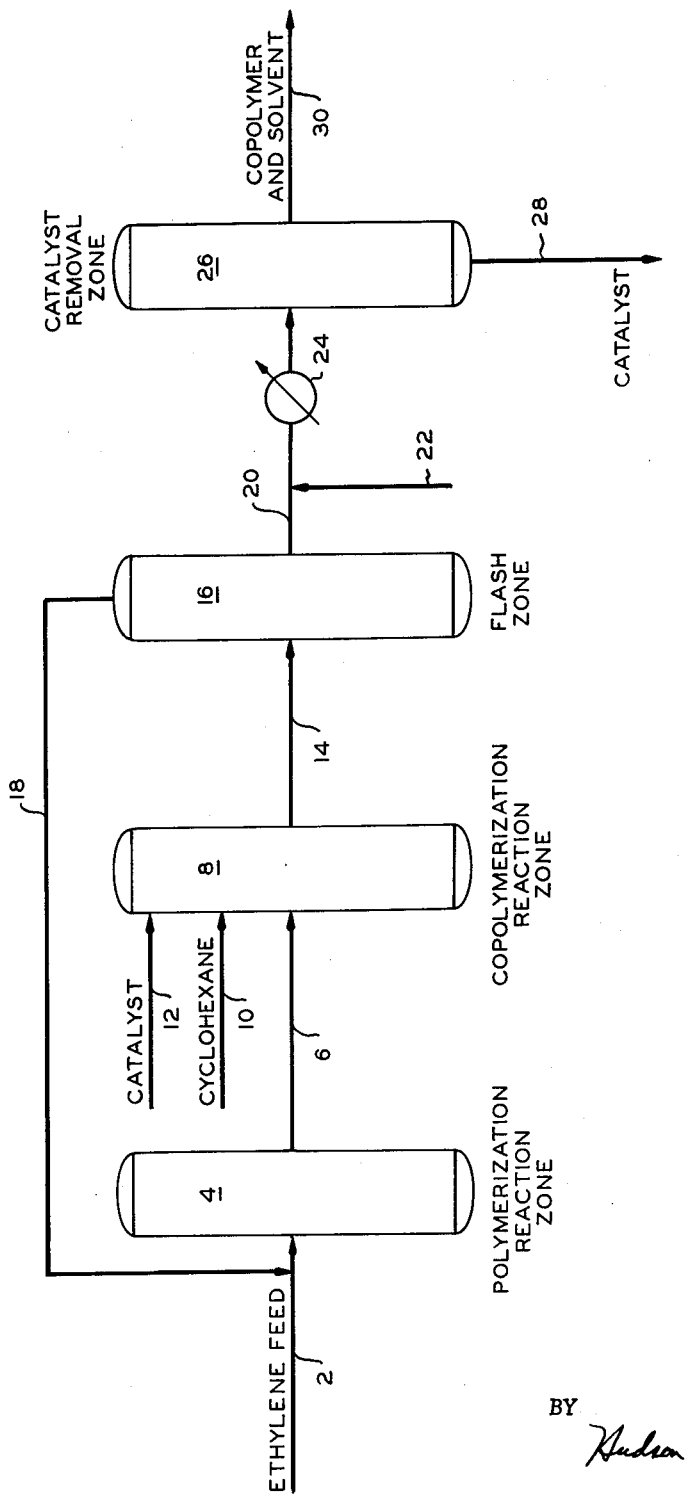

3,067,184
PRODUCTION OF ETHYLENE-BUTENE COPOLYMER
Martin R. Cines, Bartlesville, Okla., assignor to Phillips Petroleum Company, a corporation of Delaware
Filed Dec. 20, 1957, Ser. No. 704,038
4 Claims. (Cl. 260—88.2)

This invention relates to the production of ethylene-butene-1 copolymer. In one aspect it relates to a process for the preparation of ethylene-butene-1 copolymer by a catalytic polymerization of ethylene to butenes followed by the catalytic conversion of ethylene and butene-1 to the copolymer.

An important consideration in the production of copolymers such as ethylene-butene-1 copolymer is the cost of the monomers; while ethylene is very inexpensive, butene-1 is a more expensive material. When butene-1 is obtained by the dehydrogenation of butane the separation problems involved increase the cost of this material. On the other hand, when butene-1 is obtained by the dehydration of butanol the cost of the alcohol is the principal factor in determining the cost of the monomer. It has been found that butene-1 can also be produced from ethylene, for example by the dimerization of ethylene over a nickel oxide catalyst. This process is described in detail in G. C. Bailey et al. U.S. Patent 2,381,198, issued August 7, 1945. Since ethylene is relatively inexpensive the dimerization reaction provides cheap source of the butene-1 monomer. The dimerization process also has the advantage that precise separations are not required since both the ethylene and butene-1 are used in the subsequent copolymerization reaction. There is, however, one drawback to the preparation of the butene monomer from ethylene, in that the reaction does not stop with the formation of butene-1, but this material is further isomerized to butene-2. Butene-2 polymerizes at a relatively slow rate with ethylene and therefore does not participate in the copolymerization reaction to any appreciable extent. As a result any of the butene-1 which is converted to butene-2 in the dimerization step comprises in effect a loss of the valuable butene-1 monomer.

It is an object of this invention to provide an improved process for the production of ethylene butene-1 copolymer.

Another object of this invention is to provide an improved process for the polymerization of ethylene to butene-1.

Still another object of this invention is to provide an improved process for increasing product yield in the production of ethylene-butene-1 copolymer.

These and other objects of the invention will become more readily apparent from the following detailed description and discussion.

The foregoing objects are achieved broadly by polymerizing ethylene in the presence of a nickel oxide catalyst, passing the reaction effluent containing ethylene, butene-1 and butene-2 to a second polymerization step, selectively copolymerizing the butene-1 and ethylene in said second step, separating unreacted monomers from the copolymer and recycling butene-2 to the first polymerization reaction.

In one aspect of the invention unreacted butene-1 and ethylene are recycled to the polymerization reaction.

The catalytic polymerization of ethylene to butene-1 and butene-2 in the presence of nickel oxide catalysts is disclosed in detail, as previously stated, in Bailey et al., U.S. Patent 2,381,198, issued August 7, 1945. The polymerization reaction is carried out over a rather wide range of temperature but generally not lower than about 30° F. nor above about 440° F., and preferably in the range of between about 75 to about 300° F.

High pressures favor the reaction but under suitable conditions the reaction can be carried out from as low as atmospheric pressure or below to as high as 2000 p.s.i. or above. The polymerization reaction can be carried out in either the liquid or the gas phase. Usually liquid phase operation is preferred since this type of operation facilitates control of the reaction temperature. When the reaction is carried out in the liquid phase, it is desirable to provide an inert higher boiling material such as a higher boiling normal paraffin or cycloparaffin which acts as a diluent and aids in control of the polymerization temperature. The time of contact between the olefin reactant and the catalyst to produce polymerization can vary over a very wide range, that is from as low as 30 seconds to as high as several hours.

The nickel oxide catalyst can be prepared in a number of ways. Usually it is preferred to use the catalyst supported on a material such as kieselguhr, alumina, silica-alumina, charcoal and the like although it can be used without a support when prepared in a sufficiently active state. In one method of preparation nickel carbonate is reduced to metallic nickel by heating to a temperature in the range of 575 to 750° F. in a stream of hydrogen. The thereby reduced nickel is converted to the polymerization catalyst by heating it to a temperature in the range of 750 to 1300 F. and at least partially oxidizing it with oxygen. In another method active catalysts are prepared by depositing the nitrate of the metal on silica-alumina, decomposing the nitrate in a stream of nitrogen in the temperature range of 650 to 700° F. and then heating the oxide thus produced to a temperature in the range of 750 to 1300° F. in a stream of diluted oxygen. These and other methods of catalyst preparation are set forth in detail in Bailey et al., Patent Nos. 2,381,198 and 2,581,228.

The polymerization reaction can be carried out by utilizing the catalyst in a fixed bed or if desired, when carrying out the reaction in the liquid phase, a mobile catalyst can be utilized.

In addition to nickel oxide other catalysts can be used for polymerizing ethylene to mixtures of butene-1 and butene-2. Thus, in the copending application of E. O. Box, Serial No. 676,709, filed August 7, 1957, and now abandoned, organometal compounds of the metals aluminum, gallium, indium and beryllium, supported on adsorbent materials, are employed. With this type of catalysts high yields of butenes are obtained when operating in the temperature range of about 320 to 420° F. with a pressure of 400 to 1000 p.s.i.g. Complete details as to the catalyst preparation, operating conditions, etc., are set forth in this application.

Another catalyst which can be employed in the polymerization reaction is cobalt oxide, either alone or preferably in the form of a finely divided metal disposed on activated carbon or the like. This catalyst, its method of preparation, and the conditions employed in carrying out the polymerization reaction are described in detail in Anderson et al., U.S. Patent 2,380,358, issued July 10, 1945.

The catalytic copolymerization of ethylene and butene-1 is preferably carried out according to a method which is described in detail in a copending application of Hogan and Banks, Serial No. 573,877, filed March 26, 1956, now U.S. Patent 2,825,721 (1958). This particular method utilizes a chromium oxide catalyst containing hexavalent chromium associated with silica, alumina, zirconia, thoria, etc. In one embodiment of this application ethylene and butene-1 are polymerized in the presence of a hydrocarbon diluent, for example, an acyclic, alicyclic or less preferably aromatic compound which is inert and in which the formed polymer is soluble. The reaction is ordinarily carried out at a temperature between about 150° F. and about 450° F. and usually under a pressure sufficient to maintain the reactants and diluent at least partially in the liquid state. The copolymers produced by this method are characterized by having an unsaturation which is principally either trans-internal or terminal vinyl, depending on the particular process conditions employed. Copolymers are also characterized by their high densities and high percentage of crystallinity at normal atmospheric temperatures.

Other procedures which employ different catalysts are also used for preparing the ethylene-butene-1 copolymers. For example, copolymers are prepared in the presence of organometallic compounds such as triethyl aluminum, plus titanium tetrachloride, mixtures of ethyl aluminum halides with titanium tetrachloride and the like. Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium, and aluminum.

The temperature required for copolymerization varies over a relatively wide range. However, usually it is preferred to carry out the reaction at a temperature between about 200° F. and about 300° F. The particular temperature employed depends on the catalyst used and the operating conditions employed such as pressure, space velocity, diluent-to-olefin ratio etc.

The polymerization pressure is usually maintained at a sufficient level to assure a liquid phase reaction, that is, at least about 100 to 300 p.s.i.g. depending on the polymerization temperature. Higher pressures up to 500 to 700 p.s.i.g. or higher can be used if desired. If it is desired to carry out the process in the vapor state much lower pressures down to as low as atmopheric can be used. When utilizing a fixed bed the space velocity varies from as low as about 0.1 to about 20 volumes of feed per volume of catalyst per hour with a preferred range being between about 1 and about 6 volumes per volume per hour. When operating with a mobile catalyst it is desirable to maintain catalyst concentration in the reaction zone between about 0.01 and about 10 percent by weight. Residence time can be from 10 minutes or less to 10 hours or more.

The ethylene-butene-1 copolymer is formed by reacting mixtures containing between about 2 and about 15 percent by weight, preferably between about 5 and about 15 percent by weight of ethylene based on the amount of butene-1 present. Usually the relatively non-reactive butene-2 comprises only a minor portion of the reactant mixture, for example the ethylene and butene-1 combined usually comprise from about 80 to about 95 percent by weight of said mixture.

The use of a diluent in the copolymerization reaction in general serves two purposes. Since the reactions are usually exothermic in nature the presence of a quantity of diluent provides a method for obtaining close control of the reaction temperature. In addition copolymers formed in the reaction or a portion thereof may be tacky in nature and if this is the case the presence of the diluent tends to prevent adherence of the polymer to the walls of the reaction vessel and the recovery equipment which is used in treating the effluent from the copolymerization reaction. In general the quantity of diluent is large relative to the monomer feed materials. Usually the monomers constitute between about 0.1 and about 25 percent by volume of the mixture and preferably between about 2 and about 15 percent by volume.

The solvent or diluent employed in the polymerization reaction includes in general the paraffin hydrocarbons. Among the more useful solvents are acyclic paraffins having about 3 and about 12 carbon atoms per molecule such as, for example, propane, isobutane, normal pentane, isopentane, isooctane, etc., and preferably those acyclic paraffins having 5 to 12 carbon atoms per molecule. Also useful in the polymerization reaction are alicyclic hydrocarbons such as cyclohexane, methylcyclohexane, etc. Aromatic diluents are not normally used because they (or impurities therein) tend to shorten the catalyst life. However, if catalyst life is not an imporant factor in the process solvents of an aromatic nature can also be employed. All of the foregoing, and in addition other hydrocarbon diluents which are relatively inert, non-deleterious and in the liquid state at the reaction conditions can also be employed in carrying out the copolymerization reaction.

In carrying out the invention in one embodiment thereof ethylene is dimerized to a mixture comprising butene-1 and butene-2 in the presence of a catalyst, such as nickel oxide, supported on an adsorbent material. The reaction product may contain in addition to butene-1, butene-2 and unreacted ethylene a quantity of higher boiling polymers. If so it is preferable that these higher boiling polymers be removed from the reaction effluent. Following the removal step, the reaction effluent is introduced to a copolymerization zone wherein ethylene-butene-1 copolymer is formed. In the course of this reaction some of the butene-2 also copolymerizes with ethylene, however, the rate of the latter reaction as compared to the reaction of butene-1 and ethylene is very slow and the amount of butene-2 thus consumed is negligible. The effluent from the copolymerization zone is treated for the removal or separation of copolymer from the unreacted monomers. This can be accomplished by any suitable means, such as by flashing. Following this operation the copolymer, now associated principally with solvent material, is further treated for the removal of the solvent to provide a dry copolymer product. The flashed monomer material is recycled to the polymerization zone.

In order to more clearly describe the invention and provide a better understanding thereof, reference is had to the accompanying drawing which is a diagrammatic illustration of a combination polymerization and copolymerization unit suitable for carrying out the invention. Referring to the drawing ethylene gas introduced through conduit 2 is combined with flashed monomer material through conduit 18. The combined streams enter polymerization reaction zone 4 wherein the olefin reactants contact a nickel oxide catalyst supported on kieselguhr under suitable conditions to provide dimerization of ethylene to butene-1 and butene-2. The quantity of butene-2 in the recycle feed stream to zone 4 is maintained at a rate sufficient to substantially repress the formation of any substantial amount of butene-2 in this zone. Therefore, the primary reaction of the ethylene is to form butene-1. Effluent from the reaction zone passes through conduit 6 and enters copolymerization reaction zone 8. At the same time cyclohexane diluent and chromium oxide catalyst containing hexavalent chromium are introduced to zone 8 through conduits 10 and 12 respectively. For ease of handling the catalyst which is finely sub-divided is slurried in cyclohexane before it is introduced to the reaction zone. During the copolymerization reaction the material in the reactor is maintained in a highly agitated state by means of mechanical mixer or other conventional mixing means (not shown). The reaction is carried out at a temperature of about 240° F. and a pressure of about 400 p.s.i.a. and for a sufficient period of time to convert a portion of the ethylene and butene-1 to copolymer. A small, insignificant amount of the butene-2 also reacts with ethylene to form copolymer. The reaction effluent leaves zone 8 through conduit 14 and enters a flash zone 16 wherein unreacted ethylene, butene-1 and butene-2 are removed, being introduced to the polymerization reaction through conduit 18. The liquid effluent from flash zone 16, comprising essentially copolymer, cyclohexane and catalyst passes through conduit 20 and is combined with additional solvent introduced through conduit 22. The mixture then passes through exchanger 24 wherein the temperature is increased, after which it is introduced to catalyst recovery zone 26. This zone may be a filter, a centrifuge or the like designed to operate at superatmospheric pressure. Separated catalyst which is removed through conduit 28 can be recycled to the reactor or discarded. If necessary, all or part of the recycle catalyst can be subjected to a regeneration treatment with oxygen for the removal of copolymer deposit thereon during the polymerization. The remaining reaction effluent, comprising a solution of copolymer in cyclohexane, is passed through conduit 30 for further separation and processing to provide a dry copolymer product (not shown).

The preceding discussion has been directed to a preferred embodiment of the invention. However, it is not intended that this be taken in any limiting sense and it is within the scope of the invention to carry out the process with various modifications. Thus, for example, any of the catalysts previously mentioned can be employed in the polymerization and copolymerization reactions. Also, it is within the scope of the invention to carry out the polymerization reaction by utilizing a mobile catalyst as well as a catalyst disposed in a fixed bed. Thus, for example, the polymerization reaction can be carried out with nickel oxide or other catalyst in a finely divided form in the presence of a diluent with provision for a suitable means for removing the catalyst from the effluent stream and returning it to the reaction zone, such as, by providing a liquid cyclone in this stream.

The following example is presented in illustration of one embodiment of the invention applied on a commercial scale.

Example

Ethylene is polymerized in the presence of a cyclohexane diluent and a nickel oxide catalyst supported on silica alumina prepared by reducing nickel carbonate to metallic nickel, followed by oxidizing in a stream of oxygen diluted with nitrogen.

The effluent from the polymerization reaction along with additional ethylene is copolymerized in the presence of a catalyst comprising about 2.5 percent by weight of chromium as chromium oxide, containing about 2.2 percent by weight of hexavalent chromium, associated with silica alumina (weight ratio 9:1), prepared by impregnating silica alumina with a solution of chromium oxide followed by drying an activation of dry air at gradually increasing temperature up to 950° F.

The effluent from the copolymerization reaction is processed in a series of operations corresponding to those shown in the accompanying drawing.

EXAMPLE

Flows

| | | lb./hr. |
|---|---|---:|
| Fresh Feed to Polymerization Zone (2) | | 2,160 |
| Composition—Ethylene | wt. percent | 100 |
| Recycle to Polymerization Zone (18) | | 10,360 |
| Composition—Ethylene | wt. percent | 6.9 |
| Butene-1 | do | 3.2 |
| Butene-2 | do | 1.8 |
| Cyclohexane | do | 88.1 |
| Polymerization Zone Effluent (6) | | 12,520 |
| Composition—Ethylene | wt. percent | 19.8 |
| Butene-1 | do | 4.7 |
| Butene-2 | do | 2.3 |
| Cyclohexane | do | 73.2 |
| Make-up Cyclohexane to Copolymerization Zone (10) | | 20,590 |
| Catalyst to Copolymerization Zone (12) | | 230 |
| Effluent From Copolymerization Zone (14) | | 33,340 |
| Composition—Ethylene | wt. percent | 2.2 |
| Butene-1 | do | 1.5 |
| Butene-2 | do | 0.9 |
| Cyclohexane | do | 89.0 |
| Catalyst | do | 0.7 |
| Copolymer | do | 5.7 |
| Effluent From Flash Zone (20) | | 22,980 |
| Composition—Ethylene | wt. percent | 0.1 |
| Butene-1 | do | 0.7 |
| Butene-2 | do | 0.4 |
| Cyclohexane | do | 89.5 |
| Catalyst | do | 1.1 |
| Copolymer | do | 8.2 |
| Effluent From Catalyst Removal Zone (30) | | 22,750 |
| Composition—Ethylene | wt. percent | 0.1 |
| Butene-1 | do | 0.7 |
| Butene-2 | do | 0.4 |
| Cyclohexane | do | 90.5 |
| Copolymer | do | 8.3 |

Temperatures

| | °F. |
|---|---:|
| Polymerization Zone (4) | 100 |
| Copolymerization Zone (8) | 250 |
| Flash Zone (16) | 190 |
| Catalyst Removal Zone (26) | 180 |

Pressures

| | P.s.i.g. |
|---|---:|
| Polymerization Zone (4) | 240 |
| Copolymerization Zone (8) | 300 |
| Flash Zone (16) | 30 |
| Catalyst Removal Zone (26) | 14.7 |

Ethylene Dimerization (Nickel Oxide Cat.)

| | | |
|---|---|---:|
| Ethylene Feed Rate | lb./hr | 2851 |
| Butene-2 Feed Rate | do | 198 |
| Ethylene Space Velocity | v./v./hr | 5000 |
| Pressure | p.s.i.g | 240 |
| Temperature | °F | 100 |

Ethylene-Butene-1 Copolymerization

| | | |
|---|---|---:|
| Ethylene Feed Rate | lb./hr | 2492 |
| Butene-1 Feed Rate | do | 605 |
| Butene-2 Feed Rate | do | 289 |
| Cyclohexane Feed Rate | do | 29,721 |
| Copolymer Concentration in Reactor | wt. percent | 5.7 |
| Catalyst Concentration in Reactor | do | 0.7 |
| Pressure | p.s.i.g | 300 |
| Temperature | °F | 250 |

Having thus described the invention by providing a specific example thereof it is to be understood no undue limitations or restrictions are to be drawn by reason thereof and that many variations and modifications are within the scope of the invention.

I claim:

1. A process which comprises polymerizing ethylene, in a polymerization zone, to form butenes; recovering, from said polymerization zone, a mixture comprising 1-butene, 2-butene, and ethylene; passing said mixture to a copolymerization zone maintained under copolymerization conditions and thereby causing ethylene in said mixture to copolymerize with 1-butene in said mixture to form a normally solid copolymer as a product of the process; recovering, from said copolymerization zone, a fraction comprising 2-butene; and supplying said fraction to said polymerization zone, whereby formation of 2-butene in said polymerization zone is suppressed.

2. A process according to claim 1 wherein the ethylene is polymerized in said polymerization zone at a temperature in the range 30 to 430° F. in the presence of a nickel oxide catalyst and the copolymerization is conducted in said copolymerization zone at a temperature in the range 150 to 450° F. in the presence of a chromium oxide catalyst.

3. A process which comprises polymerizing ethylene in a polymerization zone to form butenes; withdrawing, from said polymerization zone, an effluent comprising 1-butene, 2-butene, ethylene, and polymers higher boiling than butenes; removing the higher boiling polymers from said effluent; passing a resulting mixture of ethylene and butenes free of higher boiling polymers to a copolymerization zone maintained under copolymerizing conditions and thereby causing ethylene in said mixture to copolymerize with 1-butene in said mixture to form a normally solid copolymer as a product of the process; recovering, from said copolymerization zone, a fraction comprising 2-butene; and supplying said fraction to said polymerization zone; whereby formation of 2-butene in said polymerization zone is suppressed.

4. A process which comprises polymerizing ethylene, in a polymerization zone, to form butenes; withdrawing from said polymerization zone, an effluent comprising 1-butene, 2-butene, ethylene, and polymers higher boiling than butenes; removing the higher boiling polymers from said effluent; passing a resulting mixture of ethylene and butenes, free of higher boiling polymers, to a copolymerization zone maintained under copolymerizing conditions and thereby causing ethylene in said mixture to copolymerize with 1-butene in said mixture to form a normally solid copolymer which is recovered from the copolymerization zone effluent as a product of the process; recovering also from said copolymerization zone effluent a fraction comprising ethylene, 1-butene, and 2-butene; and supplying said fraction to said polymerization zone, whereby formation of 2-butene in said polymerization zone is suppressed.

References Cited in the file of this patent

UNITED STATES PATENTS

| | | |
|---|---|---|
| 2,380,358 | Anderson et al. | July 10, 1945 |
| 2,381,198 | Bailey et al. | Aug. 7, 1945 |
| 2,691,647 | Field et al. | Oct. 12, 1954 |
| 2,825,721 | Hogan et al. | Mar. 4, 1958 |
| 2,889,314 | Fritz | June 2, 1959 |

FOREIGN PATENTS

| | | |
|---|---|---|
| 538,721 | Belgium | Dec. 6, 1955 |